United States Patent Office 3,100,554
Patented Aug. 13, 1963

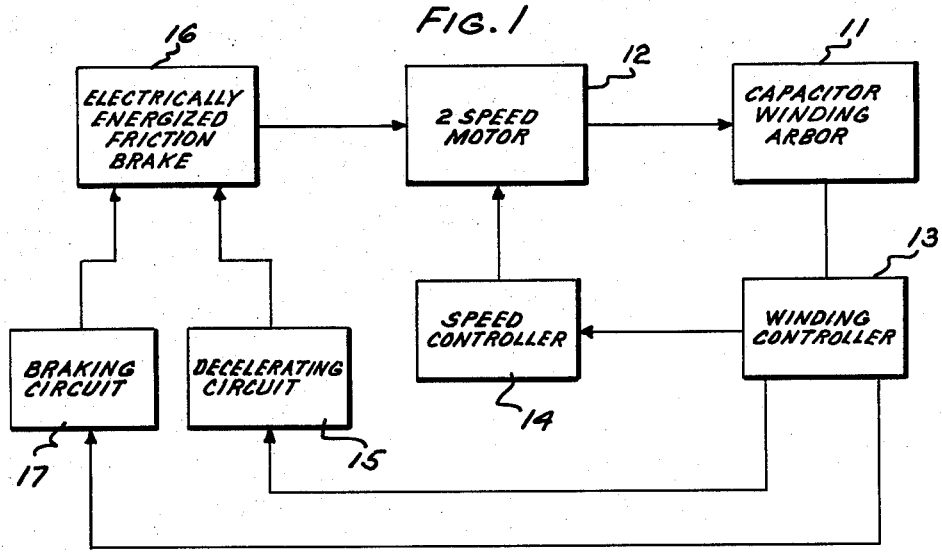
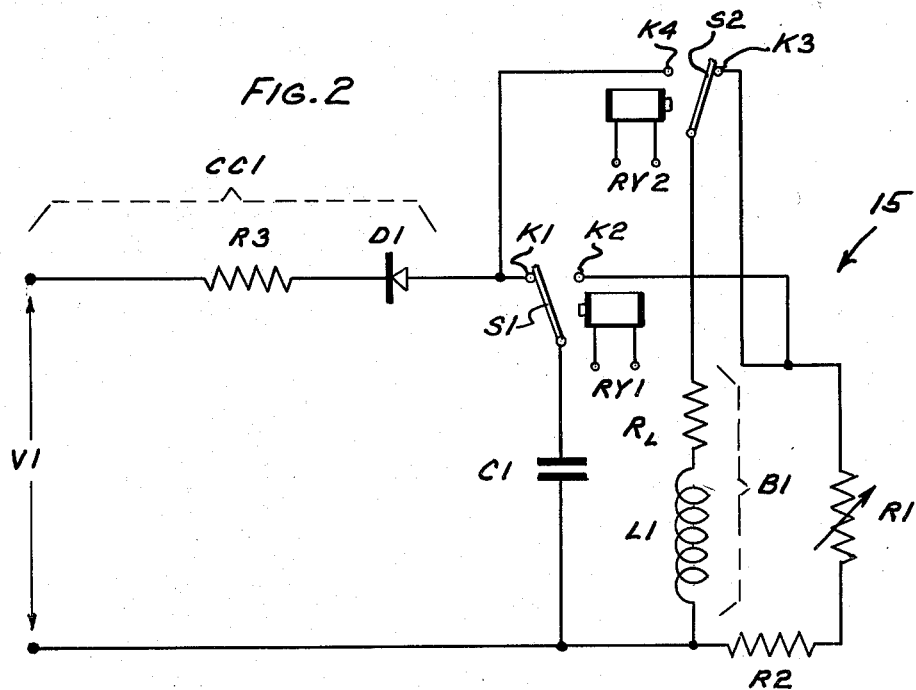

3,100,554
DECELERATING CIRCUIT
Edward R. Doubek, Jr., Brookfield, Ill., assignor to Western Electric Company, Incorporated, New York, N.Y., a corporation of New York
Filed Sept. 22, 1961, Ser. No. 140,097
4 Claims. (Cl. 188—161)

This invention relates to a decelerating circuit, and more specifically to a circuit for decelerating power driven apparatus to a secondary speed of operation. Objects of this invention are to provide new and improved circuits of such nature.

In the manufacture of wound capacitors, material is fed from supply reels to a motor driven winding arbor whereon the material is wound at a high speed. Since the winding arbor is operated at a high speed, it is difficult to control the operation thereof so that the winding arbor is stopped precisely when a prescribed number of windings have been wound thereon. Also, if the winding arbor is stopped too rapidly, the supply reels are caused to overtravel so that the material forms billows between the supply reels and the winding arbor. Therefore, it is desirable to drive the winding arbor by a two-speed motor so that the speed of operation of the winding arbor may be reduced, as the winding operation nears completion, to overcome these difficulties. Preferably, a series-wound, two-speed motor is utilized to drive the winding arbor since a high torque is required to initiate a winding operation. However, if the two-speed motor is merely switched to its secondary speed of operation as a winding operation nears completion, the motor decelerates to its secondary speed too slowly.

Therefore, another object of the invention is to brake a two-speed motor for a prescribed period of time in order to rapidly decelerate the motor to its secondary speed.

Another object of this invention is to provide a new, improved, and reliable decelerating circuit to be used in the manufacture of wound capacitors for decelerating a two-speed motor to its secondary speed of operation so that the stopping of the winding arbor may be controlled more precisely and so that overtravel of the supply reels is eliminated.

An additional object of this invention is to provide a new, improved, and reliable decelerating circuit for decelerating a two-speed motor to its secondary speed of operation by utilizing the same brake as is used to stop the motor at the completion of an operation.

A further object of this invention is to provide a new, improved, simple, and economical decelerating circuit for power driven apparatus which is regulatable so that the amount of deceleration may be varied between predetermined limits.

With these and other objects in mind, the present invention relates to a circuit for decelerating power driven apparatus. The power driven apparatus is decelerated by associating energizing circuitry with a brake winding which causes the brake winding to be energized for a prescribed period of time so that the power driven apparatus is decelerated. When the energizing circuitry is not associated with the brake winding, it is associated with conditioning circuitry so that it is conditioned for a subsequent decelerating operation.

Other objects, advantages, and aspects of the invention will become apparent by reference to the following detailed description and the accompanying drawings illustrating a preferred embodiment thereof, in which:

FIG. 1 is a block diagram illustrating a typical application of the invention in a winding operation; and FIG. 2 is a circuit diagram of a decelerating circuit in accordance with a preferred embodiment of the invention.

Referring now to FIG. 1, a capacitor winding arbor 11 is driven by a two-speed motor 12 so that material fed from supply reels is wound on the winding arbor 11 at the highest speed of motor operation. When a predetermined percentage of the desired capacitance value of the capacitor has been reached, a winding controller 13 is actuated. The winding controller 13 actuates a speed controller 14 which operates to switch the motor 12 to its secondary speed of operation and actuates a decelerating circuit 15 which operates to energize an electrically energized friction brake 16 for a prescribed period of time so that the motor 12 is rapidly decelerated to its secondary speed of operation. At the completion of the winding operation, the winding controller 13 is again actuated. The winding controller 13 again actuates the speed controller 14 which operates to switch the motor 12 off and actuates a braking circuit 17 which operates to energize the friction brake 16 so that the motor 12 is rapidly stopped.

The decelerating circuit 15 illustrated in detail in FIG. 2 includes a brake winding B1 of a commercial electrically energized friction brake which is mechanically associated with the two-speed motor 12. The brake winding B1 includes a field L1 and a field resistance $R_L$.

The decelerating circuit 15 is provided so that the brake field L1 may be energized for a prescribed period of time, which causes the motor 12 to be rapidly decelerated to its second speed of operation when the speed controller 14 has been actuated to switch the motor 12 to its secondary speed of operation. At the completion of the winding operation, the motor 12 is switched off and the brake field L1 is energized by the braking circuit 17 so that the motor is rapidly stopped. It is desirable to decelerate the motor 12 to its secondary speed of operation prior to the completion of the winding operation so that, at the completion of the winding operation, the stopping of the motor may be controlled more precisely and so that overtravel of the material being wound is eliminated.

A relay RY2 is provided to associate the brake winding B1 with either the decelerating circuit 15 or the braking circuit 17. During normal operation of the winding arbor 11, the relay RY2 is deenergized and its contact arm S2 engages a primary (deenergized) contact terminal K3 so that the brake winding B1 is associated with the decelerating circuit 15. When the winding arbor 11 and the motor 12 are to be stopped, the relay RY2 is energized and the contact arm S2 engages a secondary (energized) contact terminal K4 so that the brake winding B1 is associated with the braking circuit 17.

A variable resistor R1 and a fixed resistor R2 are connected in parallel with the brake winding B1 when the brake winding is associated with the decelerating circuit so that the amount of time the brake field L1 is energized for a decelerating operation is regulatable between predetermined limits. The value of the fixed resistor R2 determines the minimum amount of time that the brake field L1 is energized, and the variable resistor R1 allows for varying the amount of time that the brake field L1 is energized between the minimum amount of time as determined by the value of the fixed resistor R2 and a maximum amount of time as determined by the cumulative value of the fixed resistor R2 and the variable resistor R1 when the variable resistor R1 is at its maximum resistance setting. Thus, it may be seen that the amount of time that the brake field L1 is energized is directly proportional to the cumulative value of the resistors R1 and R2. The resistor R2 also limits the maximum amount of current that may flow in the decelerating circuit during a decelerating operation so that the circuit components are protected thereby.

The fixed resistor R1 and the variable resistor R2 are utilized rather than a single variable resistor with a minimum resistance stop since they provide a vernier effect, that is, they provide for fine adjustment of the cumulative resistance value.

A capacitor C1 is included in the decelerating circuit and may be selectively connected, by operation of a relay RY1, either (1) in a capacitor charging circuit CC1 so that it is charged to a predetermined potential, or (2) in parallel with both the brake winding B1 and the series arrangement of the resistors R1 and R2 so that it discharges therethrough to provide energizing potential for the brake field L1.

The relay RY1 has a contact arm S1 which engages either a primary (deenergized) contact terminal K1 or a secondary (energized) contact terminal K2. During a capacitor winding operation, the relay RY1 is deenergized so that the contact arm S1 engages the primary contact terminal K1 which connects the capacitor C1 in the charging circuit CC1 and, when the motor 12 is to be decelerated to its secondary speed of operation as the capacitor winding operation nears completion, the relay RY1 is energized under control of the winding controller 13 so that the contact arm S1 engages the secondary contact terminal K2 which connects the charged capacitor C1 in parallel with both the brake winding B1 and the series resistors R1 and R2.

The capacitor charging circuit CC1 is provided for charging the capacitor C1 and for operating as the braking circuit 17 to energize the brake field L1 when a winding operation is to be completed. The charging circuit CC1 includes (1) a voltage source V1 for providing the capacitor charging voltage or for providing energizing potential for the brake field L1, (2) a diode D1 for preventing the capacitor from discharging through the charging circuit when it is connected therein, and (3) a resistor R3 for limiting the current flow through the circuit components.

When the relay RY1 is energized to connect the charged capacitor C1 in parallel with both the brake winding B1 and the series resistors R1 and R2, the capacitor C1 discharges partially through the resistors R1 and R2 and partially through the brake winding B1 so that the brake field L1 is energized for prescribed period of time and so that the motor 12 is rapidly decelerated to its secondary speed of operation if the speed controller 14 has been actuated to switch the motor 12 to its secondary speed of operation.

As the capacitor C1 discharges partially through the brake winding B1, the brake field L1 is rapidly energized so that the brake 16 engages the motor 12 and causes the motor to be decelerated rapidly. The amount of energization of the brake field L1 then decays due to its inherent characteristics, as the capacitor continues to discharge partially therethrough, until the brake 16 drops out of engagement with the motor 12 and then the motor is free to operate at its secondary speed of operation. The period of decay of the brake winding L1 and thus the amount of time that the brake 16 engages the motor 12 are dependent on the setting of the variable resistor R1 as set forth hereinabove. The relay RY1 is deenergized after the brake 16 drops out of engagement with the motor 12 so that the capacitor C1 is connected in the charging circuit CC1 and is again charged to a predetermined potential.

When the motor 12 is to be stopped at the completion of the winding operation, the speed controller 14 operates to switch the motor off and the relay RY2 is energized to connect the brake winding B1 in the charging circuit CC1 (braking circuit 17) so that the brake field L1 is energized and the brake 16 operates to rapidly stop the motor 12.

In the winding of capacitors, the amount of overtravel of the material being wound is a direct function of both the physical size of the capacitor being wound and the physical size of the supply reels from which the material is fed. Thus, it is desirable to be able to vary the amount of deceleration of the motor 12 in accordance with the physical sizes of the capacitor being wound and the supply reels. Therefore, the variable resistor R1 has been provided in parallel with the brake winding B1 so that the amount of time that the brake field L1 remains energized and thus the amount of deceleration of the motor 12 are regulatable between predetermined limits by varying the setting of the variable resistor R1.

It may now be seen that a decelerating circuit has been provided for decelerating power driven apparatus so that the apparatus may be decelerated to a secondary speed of operation by utilizing the same brake that is used to stop the power driven apparatus.

It is to be understood that the above-described arrangement is simply illustrative of the application of this invention. Numerous other arrangements may be readily devised by those skilled in the art which will embody the principles of the invention and fall within the spirit and scope thereof.

What is claimed is:

1. A decelerating circuit for operating a brake that is mechanically associated with power driven apparatus, which comprises a brake winding for operating the brake when energized; a capacitor for providing energizing potential for the brake winding when charged; a capacitor charging circuit; a variable resistor connected in parallel with the brake winding for regulating the amount of time that the brake winding may be energized by the capacitor; first switch means for selectively connecting the capacitor either in the charging circuit or in parallel with the brake winding-resistor parallel arrangement, the capacitor being charged when connected in the charging circuit and discharging through the brake winding-resistor parallel arrangement when connected in parallel therewith so that the brake winding is energized for a prescribed period of time, the amount of time that the brake winding is energized being regulatable between predetermined limits by varying the setting of the variable resistor, the power driven apparatus being decelerated in response to and in proportion to the amount of time that the brake winding is energized, and second switch means for connecting the brake winding to the charging circuit so that the brake winding may be continuously energized for any desired period of time.

2. The decelerating circuit as recited in claim 1, wherein the variable resistor includes a series arrangement of a fixed resistor and a variable resistor.

3. A decelerating circuit for operating a brake which comprises a brake winding for operating the brake when energized; decelerating means for energizing the brake winding for a prescribed period of time; means for conditioning the decelerating means for a decelerating operation; means for selectively associating the decelerating means with either the brake winding or the conditioning means; and stopping means for energizing the brake winding for an indefinite period of time through continuous association with the conditioning means.

4. The decelerating circuit as recited in claim 3, wherein means are provided for regulating the amount of time that the brake winding is energized by the decelerating means.

References Cited in the file of this patent

UNITED STATES PATENTS

| 2,697,802 | Decker et al | Dec. 21, 1954 |
| 2,927,474 | Peras | Mar. 8, 1960 |